(12) United States Patent
Green et al.

(10) Patent No.: US 7,383,132 B2
(45) Date of Patent: Jun. 3, 2008

(54) METHOD FOR IDENTIFYING RESISTIVITY ANOMALIES IN ELECTROMAGNETIC SURVEY DATA

(75) Inventors: Kenneth Green, Houston, TX (US); Olivier M. Burtz, Houston, TX (US); Denny E. Willen, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 182 days.

(21) Appl. No.: 11/351,785

(22) Filed: Feb. 10, 2006

(65) Prior Publication Data

US 2006/0197534 A1 Sep. 7, 2006

Related U.S. Application Data

(60) Provisional application No. 60/659,325, filed on Mar. 7, 2005.

(51) Int. Cl.
*G01V 1/28* (2006.01)
*G06F 19/00* (2006.01)
(52) U.S. Cl. .......................................... 702/6; 702/14
(58) Field of Classification Search .............. 702/1–14; 703/1–5
See application file for complete search history.

(56) References Cited

U.S. PATENT DOCUMENTS 6,098,019 A  8/2000  Hakvoort et al. .............. 702/7
6,131,071 A * 10/2000  Partyka et al. ................. 702/16
6,263,284 B1 * 7/2001  Crider et al. .................. 702/14
6,628,119 B1  9/2003  Eidesmo et al. ............ 324/337

FOREIGN PATENT DOCUMENTS

WO  WO/03-048812  6/2003
WO  WO/2004-083898  9/2004

OTHER PUBLICATIONS

Chave, A.D., Constable, S. and Edwards, R.N. (1991) "Electrical Exploration Methods for the Seafloor", *Electromagnetic Methods in Applied Geophysics*, pp. 931-966, Society of Exploration Geophysicists.
Eidesmo, T., et al. (2002) "Sea Bed Logging (SBL), a New Method for Remote and Direct Identification of Hydrocarbon Filled Layers in Deepwater Areas", *First Break* 20.3, 144-152.

(Continued)

*Primary Examiner*—John Barlow
*Assistant Examiner*—Victor J. Taylor
(74) *Attorney, Agent, or Firm*—Exxon Mobil Upstream Research Company Law Dept.

(57) ABSTRACT

Method for enhancing resistive anomalies in electromagnetic geophysical survey data. Scaled values of a measured electromagnetic field parameter are plotted on a depth section at locations related to corresponding source/receiver locations. Scaling is performed relative to a reference signal selected to represent a baseline free of unknown resistive bodies. Scaled values are represented by a color scale in the display, and the color scale may be adjusted to enhance perceived anomalies. The method may be employed in either the frequency domain or the time domain.

16 Claims, 2 Drawing Sheets
(1 of 2 Drawing Sheet(s) Filed in Color)

OTHER PUBLICATIONS

Ellingsrud, S. et al., (2002) "Remote Sensing of Hydrocarbon Layers by Seabed Logging (SBL): Results from a Cruise Offshore Angola", *The Leading Edge* 21, pp. 972-982.

MacGregor, L., Sinha, M. and Constable, S. (2001) "Electrical Resistivity Structure of the Valu Fa Ridge, Lau Basin, from Marine Controlled-Source Electromagnetic Sounding", *Geophy. J. Int.* 146, 217-236.

Sheriff, R.E. (2002) *Encyclopedic Dictionary of Applied Geophysics*, Society of Exploration Geophysicists, 4th edition, pp. 278-279.

EP Search Report No. 112502US dated Aug. 8, 2005 (1 page).

* cited by examiner

Less Resistive ▨ ▨ More Resistive
Relative Amplitude

METHOD FOR IDENTIFYING RESISTIVITY ANOMALIES IN ELECTROMAGNETIC SURVEY DATA

This application claims the benefit of U.S. Provisional Patent Application No. 60/659,325 filed on Mar. 7, 2005.

FIELD OF THE INVENTION

This invention relates generally to the field of geophysical prospecting and, more particularly, to electromagnetic surveys. Specifically, the invention is a method for interpretation of data gathered with controlled source electromagnetic surveys in offshore environment (a controlled electromagnetic transmitter is towed above receivers fixed on the sea floor).

BACKGROUND OF THE INVENTION

Controlled-source electromagnetic ("CSEM") geophysical surveys use man-made sources to generate electromagnetic fields to excite the earth, and deploy receiver instruments on the earth's surface, on the seafloor, in the air, or inside boreholes to measure the resulting electric and magnetic fields, i.e., the earth's response to the source excitation. FIG. 1 illustrates the basic elements of an offshore CSEM survey. A vessel tows a submerged CSEM transmitter 11 over an area of subseafloor 13. The electric and magnetic fields measured by receivers 12 are then analyzed to determine the electrical resistivity of the earth structures beneath the surface or seafloor. This technology has been applied for onshore mineral exploration, oceanic tectonic studies, and offshore petroleum and mineral resource exploration. See A. D. Chave, S. Constable, and R. N. Edwards, in *Electromagnetic Methods in Applied Geophysics* (ed. M. N. Nambighian), Vol. 2, 931-966, Society of Exploration Geophysicists; L. MacGregor, M. Sinha, and S. Constable, *Geophy. J Int.* 146, 217-236 (2001); T. Eidesmo, S. Ellingsrud, L. M. MacGregor, S. Constable, M. C. Sinha, S. Johansen, F. N. Kong, and H. Westerdahl, *First Break* 20.3, 144-152 (2002).

The conventional method of displaying electromagnetic data for interpretation is to show the amplitude of the electric field versus offset (distance between transmitter and receiver). As FIG. 2 illustrates, the picture becomes very confusing if the data corresponding to all receivers of the same tow line are displayed together.

Another data display method consists in selecting a constant offset and displaying, in map view, the ratio or the difference between the observed amplitude at this offset and a reference amplitude (S. Ellingsrud, et al., *The Leading Edge* 21 972-982, (October, 2002)). The selection of one unique offset may not be optimal, and valuable information is lost if one cannot look at the whole-offset curve.

MacGregor and Sinha disclose presenting the results of a CSEM survey using normalized values wherein the observed field is divided by the field calculated for a reference model. Alternatively, they state that normalization could be based on the survey data itself, using data collected adjacent to the target. They suggest this technique for allowing clearer visualization of effects of buried structures on CSEM signal properties, effects that might otherwise be less clear because the signal amplitude in a typical survey is likely to vary by several orders of magnitude over the useful set of offsets. (PCT International Publication No. WO 03/048812, Jun. 12, 2003)

SUMMARY OF THE INVENTION

In one embodiment, the invention is a method for displaying electromagnetic survey data to reveal resistive bodies in a subterranean region, said data obtained using an electromagnetic source moved to a plurality of positions along a survey line above the subterranean region with a plurality of electromagnetic receivers fixed along or near the survey line, said method comprising: (a) selecting a parameter related to electric or magnetic fields measured by the receivers, said parameter being selected to be dependent upon resistivity of subsurface layers penetrated by the electric and magnetic fields, and obtaining that parameter from the measured electromagnetic data for a plurality of source and receiver locations; (b) selecting a reference signal, said reference signal being representative of values of the selected electromagnetic parameter that would be generated by said electromagnetic source at the plurality of source and receiver locations absent targeted resistive bodies; (c) scaling the selected measured parameter using the reference signal; (d) plotting the scaled parameter values displayed by a color scale on a section graph with abscissa defining position along the survey line and ordinate defining depth in said subterranean region; and (e) identifying any anomalies in the color display of said plot, anomalies being areas in which the measured parameter differs from the reference signal.

The electromagnetic parameter to be obtained from data measured by the receivers and plotted, after scaling, can be, for example, any of: (a) electric field amplitude; (b) amplitude of an electric field component; (c) electric field phase; (d) magnetic field amplitude; (e) amplitude of a magnetic field component; (f) magnetic field phase; and (g) a combination of any of the preceding.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for displaying the electromagnetic data as relative amplitudes along the tow line in a cross-section format. In this way, the information corresponding to all receivers and all offsets (source-receiver separations) can be displayed and interpreted at the same time. It also permits the co-rendering of the electromagnetic data with seismic data or a geologic model. If the different cross-sections of a survey are displayed together in their spatial coordinates, the shape of the resistivity anomalies can be seen in three dimensions.

The amplitudes (in the frequency domain) of the recorded electric field are color-coded after being scaled by a reference signal. In some embodiments of the present invention, what is displayed is the relative amplitude of the horizontal component of the electric field that is parallel to the direction of the tow line. Alternatively, other components (vertical and horizontal—perpendicular to the tow line direction) of the electric or magnetic fields can be used, and phase can be used instead of amplitude, or a combination of phase and amplitude.

Figure 1:
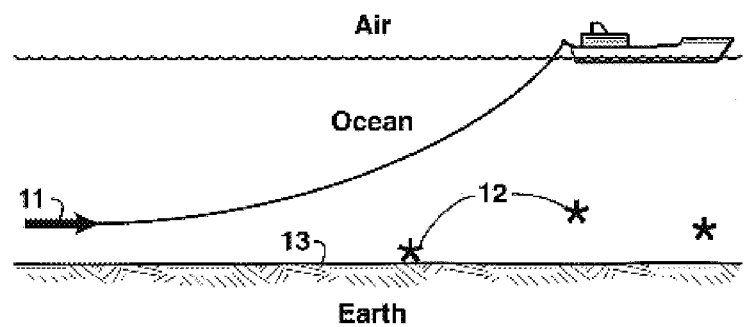
FIG. 1 is a schematic diagram illustrating offshore controlled source electromagnetic surveying using a horizontal electric dipole source.
Figure 2:
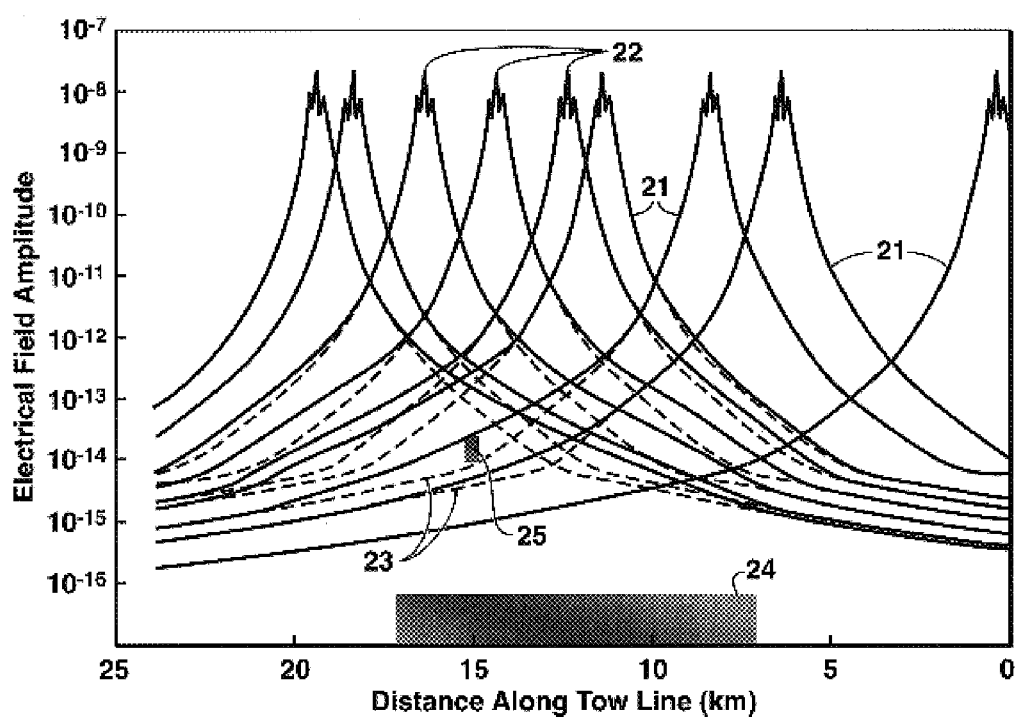
FIG. 2 is a conventional display of measured electric field vs. transmitter location for several receiver locations along a tow line for interpretation of a CSEM survey.

FIG. 2 shows how CSEM is conventionally displayed for interpretation. The receivers 22 are plotted at their true locations along the tow line (horizontal axis) on the sea floor. In this manner, the response of all receivers along a given source tow line is displayed in a single graph. Each inverted "V" 21 represents the electric field amplitude (vertical axis) measured by the receiver located at the abscissa of the tip of the inverted "V." For any point on a particular curve 21, the ordinate is the value of the electric field amplitude measured by the receiver located at the tip of the inverted "V" 21, when the source was at the abscissa position along the source tow line. Thus, all points on any particular curve 21 were measured at the same receiver. For practical reasons, only the amplitudes above the noise level are displayed. The amplitude peaks for each receiver at zero offset because that is where the source comes closest to the receiver. The dashed-line curves 23 represent reference values of the selected field parameter. Typically, the reference curves are obtained from measurements using the same source parameters, but at a receiver located over a region thought to contain no resistive bodies within the depth of penetration of the CSEM source. This reference data-set is repeated for each receiver, thus FIG. 2 shows a reference curve for each receiver. Near the receiver locations (near the tops of the inverted V's), the measured curve 21 and the reference curve 23 coincide almost completely because the short-offset amplitude is only sensitive to the shallow resistivity structure, which is constant here. What the CSEM interpreter looks for are differences, called anomalies, e.g., 25, between a measured curve 21 and its reference curve 23. As stated previously, such a display is confusing and very difficult to interpret for locating the resistive body (actually located at 24) that caused the anomalies such as 25.

Figure 3:
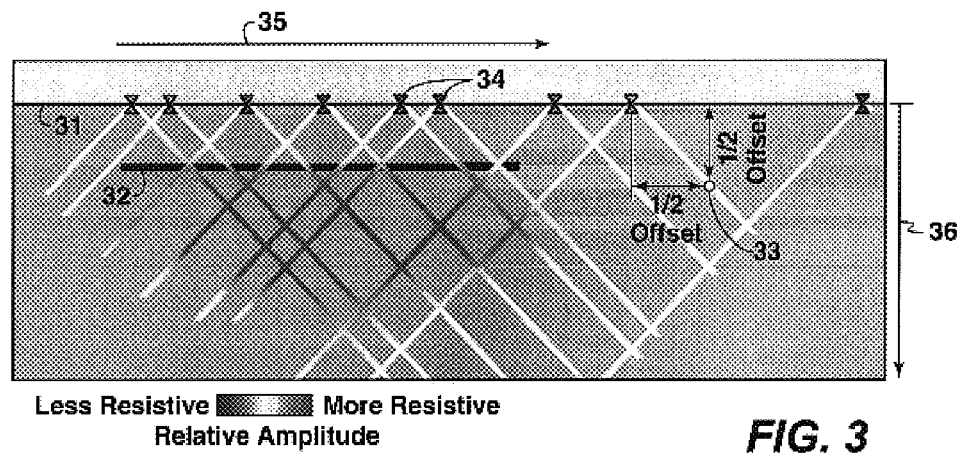
FIG. 3 shows the data of FIG. 2 displayed according to the present invention, with scaled electromagnetic data plotted by color at the source-receiver midpoint and at a pseudo-depth equal to one-half of the offset.

FIG. 3 shows a display of the same data as in FIG. 2, but with the benefit of the present inventive method. As in FIG. 2, the data lines form inverted V's with the apex indicating the receiver true location 34 along the tow line. Also the same as FIG. 2, the horizontal scale 35 is true distance along the tow line (the receivers are located at their true geographic coordinates), but now (in FIG. 3) the vertical scale 36 is depth below the water bottom 31. Displaying the data in this manner allows direct comparison to a seismic section or a geologic section. The field measurements are now represented by color coding, as indicated by the user-designed color bar in FIG. 3. However, what is plotted (by color) is not just the measured field amplitude, but instead the measured amplitude divided (or scaled in some other way) by the reference amplitude corresponding to the same source/receiver locations. In real geologic settings, the measured data vary over several orders of magnitude while the anomalies of interest are much smaller (typically, less than one order of magnitude). By first scaling the measurements by a reference and then suitably adjusting the color scale, the present inventive method makes the anomalies much more obvious.

In the color scale selected for FIG. 3, red indicates that the actual data is much more resistive than the reference (curve 21 is well above corresponding curve 23, for example at anomaly 25 in FIG. 2). A person skilled in CSEM work will understand how to determine if measured data indicate more or less resistance than the corresponding reference. In essence, more signal implies less attenuation corresponding to more resistance. Yellow denotes more resistive than the reference, but less so than red. Blue indicates less resistance than the reference. For example, the area in the vicinity of salt domes with brine-saturated sediments might show up blue. In the particular color scale selected for FIG. 3, white indicates that the ratio of measured amplitude to reference amplitude is approximately unity; i.e., the observed data are the same as the reference data and there is no resistivity anomaly. Other colors, primarily orange which is intermediate between yellow and red, complete the range of resistive amplitudes as indicated in the drawing's color scale. It may be most convenient to select the most conductive data as reference, and therefore any relative amplitude should be greater than 1. However, it is possible to select another color scale that would show relative amplitude less than 1 in order, for example, to highlight data problems such as noise or sub-optimal navigation or source geometry. Anomalies that have greater resistance than their surroundings are of primary interest because that property suggests petroleum deposits. However, the invention may also be used to identify conductive bodies, i.e., bodies that are less resistive than the material they are embedded in. Therefore, it shall be deemed understood that expressions such as "resistive bodies," as used herein to refer to resistive anomalies, include both bodies having greater electrical resistance than their environment and bodies having less resistance than their surroundings.

The scaled CSEM data is posted in the display as follows. A given item of data corresponds to a certain source position and a certain receiver position. The abscissa for that data point is chosen to be related to those two positions. A preferred choice is to post the datum at an abscissa value half way between the source position and the receiver position since that is a reasonable estimate of the average location of the portion of the subsurface being sampled by the particular source-receiver pair. In general, the abscissa is the receiver position plus the signed (+or −) scaled (typically, but not necessarily, one-half) offset distance (source-receiver spacing). The sign is determined by the position of the source and receiver with respect to the direction of the tow line: negative for source before the receiver, positive for sources after the receiver. For the choice of vertical position (ordinate), the invention does not invert the data or image the data in any other way. Vertical position must be estimated. A preferred estimate for the ordinate, but not the only possible estimate, is one-half of the offset. Thus, in a preferred embodiment of the present invention, the color-coded relative amplitude observation corresponding to a given source-receiver pair is posted at a depth coordinate equal to half the distance between the source and the receiver—and therefore may be termed a pseudo-depth—and at a pseudo-horizontal coordinate equal to the receiver coordinate plus the signed scaled (typically half) offset distance between the source and the receiver. This convention illustrated at 33 is consistent with the well-known electromagnetic skin-depth effect in which it is recognized that electromagnetic fields in the earth fall off exponentially as the reciprocal of the square root of their frequency. As persons trained in the art may recognize, setting the pseudo-depth equal to one-half the offset is one step in plotting a data display called a "pseudosection." (See R. E. Sheriff, *Encyclopedic Dictionary of Applied Geophysics*, Society of Exploration Geophysicists, 4th edition (2002)).

With this or a similar convention, experience has shown that a resistive anomaly in the relative amplitude (the yellow-orange-red region in FIG. 3) roughly corresponds to a resistive body in the subsurface whose top is at a depth corresponding to the pseudo-depth of the top of the relative amplitude anomaly (white to yellow-orange transition in FIG. 3) and whose horizontal limits correspond to the horizontal limits of the relative amplitude anomaly. Since the electromagnetic data of FIG. 3 were computed from a model, it is possible to overlay this model with its true horizontal and vertical coordinates on FIG. 3. The water sediment interface 31 is flat (blue, thick line), the relatively conductive shale background is displayed in gray and the resistive anomaly 32 is the 200 m thick, black rectangle, 1000 m below the sea floor. The correlation between the top and lateral extent of the black rectangle 32 and the relative amplitude anomaly (yellow to red) is obvious. It clearly would be much more difficult to draw the same interpretation from FIG. 2 (the conventional way to look at data). As described to this point, the method cannot determine the thickness of the resistive body.

In the real world, the relative amplitude plot from the present inventive method, such as the plot of FIG. 3, can be overlaid over seismic data (converted to depth) or any a priori model of the subsurface. FIG. 3 is a two-dimensional section, but it is referenced with true geographic coordinates. If several tow lines were recorded, it is easy to display several relative amplitude sections with well known 3D visualization techniques to show the anomalies in 3D space. The extension of the invention to three dimensions is thus obvious including, for example, the display of data from receivers that do not lie directly below a transmitter tow line.

The reference data used to compute the relative amplitude can be derived from an actual experiment (in an area where no anomaly is supposed to be present) or, frequently better, can be simulated (through Maxwell's equations and 1D, 2D or 3D simulation software) from an a priori model, generally corresponding to the corresponding wet-reservoir case scenario (i.e., no petroleum deposits and hence no regions of higher resistivity anywhere in the model). If the reference is derived from an a priori model, the reference can be significantly different for each receiver because the a priori model can also include non-hydrocarbon related resistive bodies (volcanics, carbonates, salt, etc.) or resistivity variation in the shale background and true 3D water bottom topography. The anomalies showing up on the relative amplitude sections are then directly correlated to the hydrocarbon presence in the target reservoir.

Experience indicates that results are improved when several different sections like FIG. 3 corresponding to different source frequencies are used, e.g., high frequencies (0.8-2 Hz) to better image shallow prospects and lower frequencies (0.5-0.01 Hz) for deeper targets.

Figure 4:
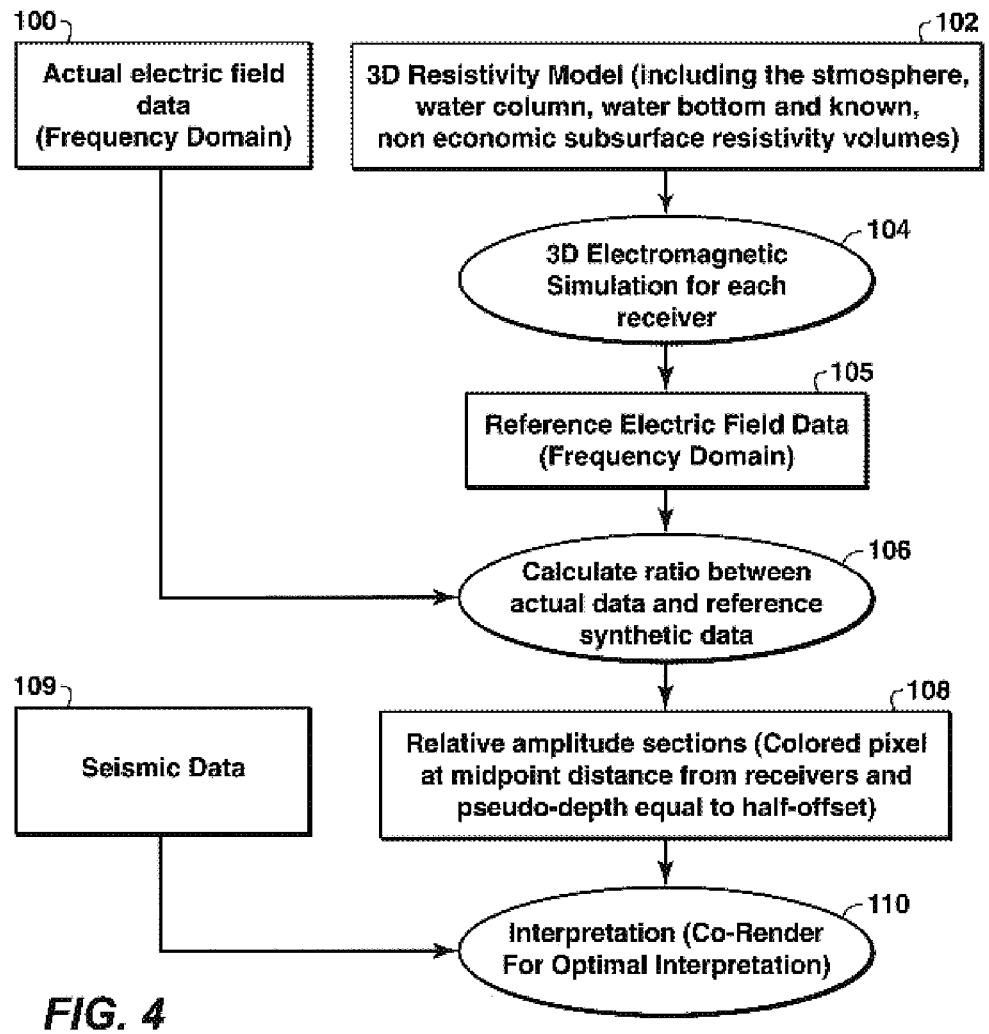
FIG. 4 is a flow chart showing the primary steps of one embodiment of the present inventive method.

FIG. 4 is a flow chart summarizing the basic steps in one embodiment of the present inventive method. It is described for the amplitude of the electric field, but the same workflow could be applied to phase data or magnetic fields or any combination or function of any of these. A 3-D resistivity model 102 is created from available geologic knowledge. It includes at least the water column, water bottom, and the background resistivity of the sediment (usually, mainly shale). No highly resistive layers or bodies are included in the subsurface region unless there are known features (e.g., salt bodies, volcanics etc. . . . ) that one desires to include in the reference response so as to enable any unknown resistive bodies to be better distinguished. Similarly, if the atmosphere is believed to contribute significantly at the frequencies of interest, it could be included in the model 102. At step 104, the 3-D electromagnetic response of the model from step 102 is simulated for each receiver in the survey. As previously disclosed, this involves solving Maxwell's field equations using the source parameters and source-receiver geometry used in the actual survey. The result 105 is the reference electric field data-set, i.e., what can be expected from the known (or assumed) geology. At step 106, the ratio between the measured electric field data 100 and the reference data from step 105 is calculated for all survey receiver positions and each source position, or a selected subset of these points. Instead of dividing the measured value of the field parameter by the reference value to obtain the simple ratio, any method of using the reference value to scale the corresponding measured value can be used (for instance, it is preferred to subtract the phase data). The resulting scaled values 108 are displayed as described in connection with FIG. 3, using color to represent the scaled values. Any equivalent of a color scale may be used, such as a gray scale. The word "color" as used herein will be understood to include such equivalents. The user can vary the color scale to enhance perceived anomalies. The user may also wish to clip the scaled values at a selected value such as twice the reference value to better reveal the full extent of the resistive body. At step 110, the color anomalies are interpreted. Typically, ratios greater than unity (red in FIG. 3) mean a region more resistive than the reference. These are the regions of interest for oil and gas exploration. Seismic attribute sections 109 extracted along the survey line as well as the reference resistivity model 102 may be co-rendered with the relative amplitude data to aid the interpretation. Readily available visualization software are used in this process. Steps 104 through 108 are readily automated by programming a computer.

By altering the underlying model 102 and observing the resulting change in the display 108, it is possible to iterate the process described in FIG. 4 in order to achieve an acceptable level of agreement between the actual data 100 and reference data 105. Such an iterative process might be used, for example, to refine an estimate of the thickness of the resistive body 32 or to develop a model 102 that is consistent with data 100 corresponding to multiple temporal frequencies.

Display sections produced by the present inventive method can also be used as a quality control tool to recognize source-related anomalies due to (for instance) altitude variation above the sea-floor or feathering and thus distinguish them from the anomalies of economic interest. Such source-related anomalies tend to appear as color streaking parallel to the sides of the inverted V's and with similar relative (scaled) amplitudes across multiple receivers. In some implementations of the invention, the reference data 105 may be synthesized based on source parameters and source-receiver geometries that approximate actual values or that are notional values representing the original data acquisition plan. Under these conditions, the invention would serve to highlight data anomalies that represent imperfections in the data acquisition.

The invention is most commonly practiced in the frequency domain, data having either been directly acquired at specific frequencies and offsets or having been converted to frequency beginning with data from a continuously-towed transmitter. Such continuous-towed data are often divided into time segments ("bins") corresponding to a suitably small range of offsets (typically, offsets varying by no more than 200 meters) and then extracting the frequency content of each bin by the method of Fourier Analysis.

In alternative implementations, the method could be practiced directly in the time domain, such time-domain data having been acquired with a stationary transmitter, a generally fixed offset, or with a continuously-towed transmitter. In such an alternative implementation, the data would be obtained during time segments in which the transmitter was generally inactive ("off"), such data corresponding to decaying electric field values that are diagnostic of the earth's resistivity structure. Data within each time segment would be scaled by reference data that was itself either measured or computed in the time domain. From the data set corresponding to a number of such time segments, each time segment corresponding to a different offset, those data would be taken that correspond to a particular selected elapsed time after the transmitter was turned off. These data would be displayed in the manner of FIG. 3 at a location estimated from the value of the elapsed time and the offset. In one implementation, the data values would be displayed at an abscissa equal to the source-receiver midpoint and an ordinate equal to one-half the offset. In other implementations, the ordinate or pseudo-depth would be proportional to the elapsed time. Choosing a pseudo-depth for a data display such as FIG. 3 to be a function of time during the off segments will allow the user to associate short-lived or rapidly-decaying electric field data with shallower depths and long-lived or slowly-decaying electric field data with deeper depths according to the well-known electromagnetic skin-depth effect. In another implementation, the selected elapsed time would be chosen as proportional to the square of the depth of interest, based on a depth of penetration that is proportional to the skin depth. In yet another implementation, a plurality of elapsed times would be used to display data at a plurality of pseudo-depths.

The foregoing description is directed to particular embodiments of the present invention for the purpose of illustrating it. It will be apparent, however, to one skilled in the art, that many modifications and variations to the embodiments described herein are possible. For example, the model 102 could be restricted to a resistivity structure that varies in only one or two dimensions. For another example, the preceding description of the invention is in the context of looking for resistive bodies below the water bottom in a marine environment. However, CSEM surveys may be performed as well on land, and the present inventive method is equally suitable to display the resulting data regardless of the survey environment. All such modifications and variations are intended to be within the scope of the present invention, as defined in the appended claims.

We claim:

1. A method for displaying electromagnetic survey data to reveal resistive bodies in a subterranean region, said data obtained using an electromagnetic source moved to a plurality of positions along a survey line above the subterranean region with a plurality of electromagnetic receivers fixed along or near the survey line, said method comprising:
   (a) selecting a parameter related to electric or magnetic fields measured by the receivers, said parameter being selected to be dependent upon resistivity of subsurface layers penetrated by the electric and magnetic fields, and obtaining that parameter from the measured electromagnetic data for a plurality of source and receiver locations;
   (b) selecting a reference signal, said reference signal being representative of values of the selected electromagnetic parameter that would be generated by said electromagnetic source at the plurality of source and receiver locations absent targeted resistive bodies;
   (c) scaling the selected measured parameter using the reference signal;
   (d) plotting the scaled parameter values displayed by a color scale on a section graph with abscissa defining position along the survey line and ordinate defining depth in said subterranean region; and
   (e) identifying any anomalies in the color display of said plot, anomalies being areas in which the measured parameter differs from the reference signal.

2. The method of claim 1, wherein the abscissa and ordinate values for plotting a scaled parameter value are estimated from the corresponding source-receiver spacing using electromagnetic skin effect theory applied at the electromagnetic source's transmission frequency.

3. The method of claim 2, wherein the ordinate value is equal to one-half the source-receiver spacing and the abscissa value is the average of the source and receiver positions.

4. The method of claim 1, wherein the scaling is dividing the parameter's value by the reference value at the graph position where the scaled parameter value is to be plotted.

5. The method of claim 4, wherein scaled values greater than unity are interpreted as indicating proportionately greater resistivity than the reference signal.

6. The method of claim 1, wherein said parameter related to electric or magnetic fields measured by the receivers is selected from a group consisting of: (a) electric field amplitude; (b) amplitude of an electric field component; (c) electric field phase; (d) magnetic field amplitude; (e) amplitude of a magnetic field component; (f) magnetic field phase; and (g) a combination of any of the preceding.

7. The method of claim 1, wherein said reference signal is a model-calculated response.

8. The method of claim 1, wherein said reference signal is obtained from off-structure measurements.

9. The method of claim 1, further comprising adjusting the color scale to enhance anomalies.

10. The method of claim 1, further comprising over-laying said color display with a seismic attribute section to further confirm identification of resistive bodies.

11. The method of claim 1, wherein said survey data are acquired in the frequency-domain.

12. The method of claim 11, wherein frequency-dependent data are extracted from the acquired data by Fourier analysis.

13. The method of claim 12, wherein the ordinate values for plotting a scaled parameter value are chosen to be inversely proportional to the square root of the data frequency.

14. The method of claim 1, wherein said survey data are acquired in the time domain.

15. The method of claim 14, wherein the source is alternately turned off and on during data acquisition, and the data for plotting were obtained while the source was off, as a function of elapsed time after the source was turned off.

16. The method of claim 15, wherein the ordinate is chosen to be a function of transmitter off time.

* * * * *